F. P. GABLE & A. C. BUTTMAN.
HORSE DETACHING DEVICE.
APPLICATION FILED FEB. 27, 1911.
1,006,842.
Patented Oct. 24, 1911.
2 SHEETS—SHEET 2.
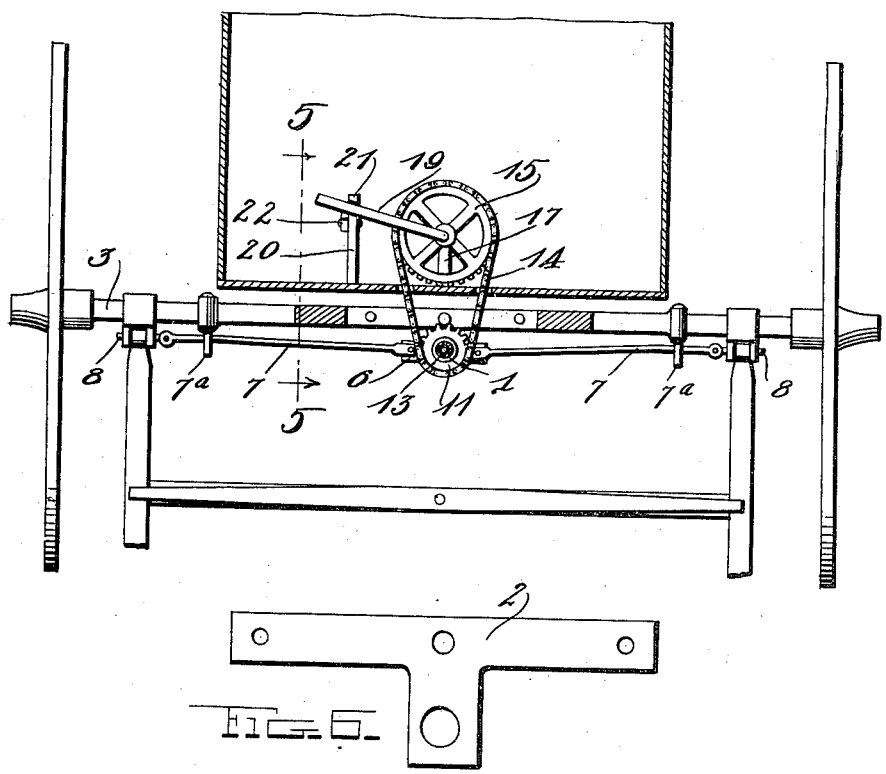
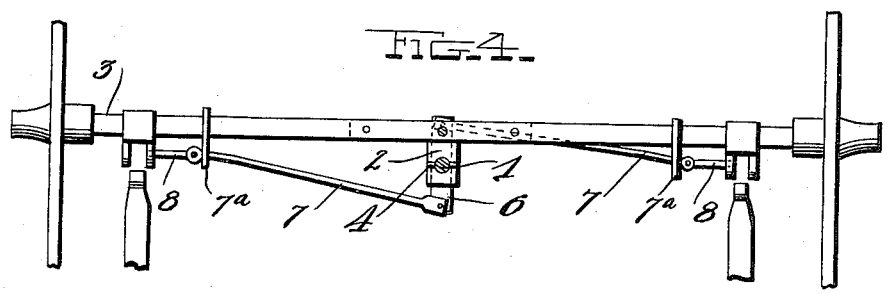
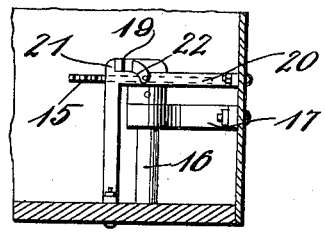
Witnesses
J. R. Pierce
O. B. Hopkins
Inventors
F. P. Gable
A. C. Buttman
by H. B. Willson & Co.
Attorneys

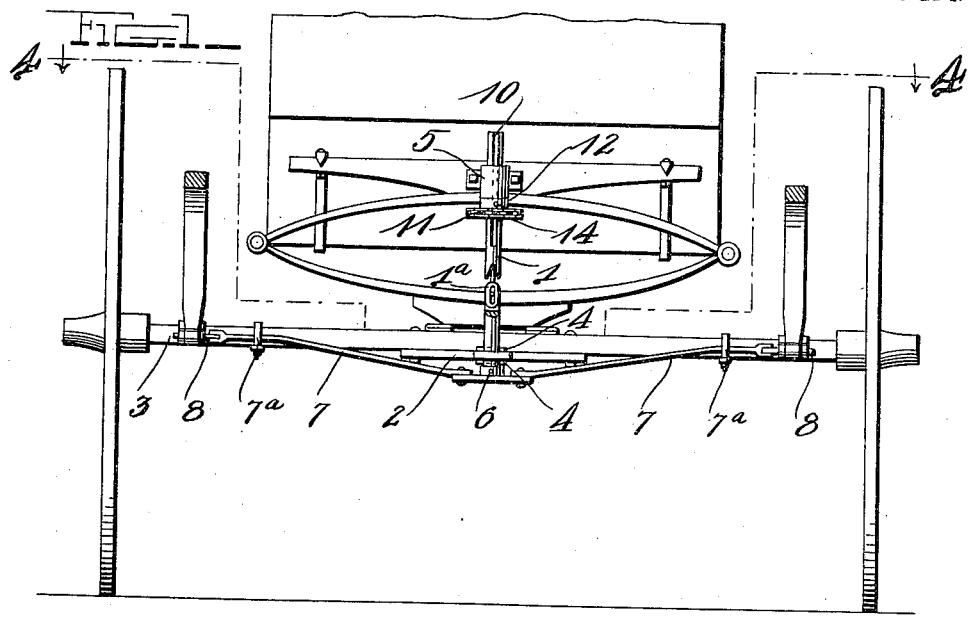
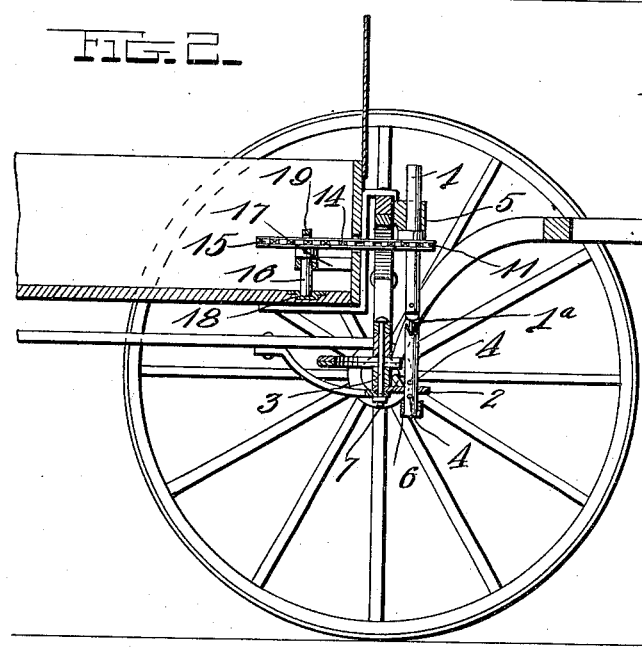
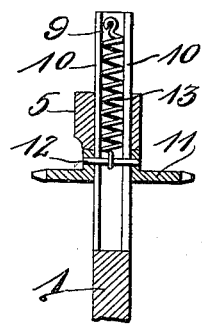

UNITED STATES PATENT OFFICE.

FRANKLIN P. GABLE AND ALONZO C. BUTTMAN, OF GRANDVIEW, IOWA.

HORSE-DETACHING DEVICE.

1,006,842.     Specification of Letters Patent.     Patented Oct. 24, 1911.

Application filed February 27, 1911. Serial No. 611,012.

*To all whom it may concern:*

Be it known that we, FRANKLIN P. GABLE and ALONZO C. BUTTMAN, citizens of the United States, residing at Grandview, in the county of Louisa and State of Iowa, have invented certain new and useful Improvements in Horse-Detaching Devices; and we do declare the following to be a full, clear, and exact description of the invention, such as will enable others skilled in the art to which it appertains to make and use the same.

This invention relates to improvements in horse detaching devices.

One object of the invention is to provide a horse detaching device having an improved construction and arrangement of means for operating the releasing mechanism adapted to be quickly operated by the hand or foot of the driver.

Another object is to provide a device of this character which will readily adjust itself to the movement of the body of the vehicle on its springs.

With these and other objects in view, the invention consists of certain novel features of construction, combination and arrangement of parts as will be more fully described and afterward specifically claimed.

In the accompanying drawings:—Figure 1 is a front view of a vehicle showing the application of the invention; Fig. 2 is a central vertical longitudinal section thereof; Fig. 3 is a horizontal sectional view of the front end of the vehicle showing a plan view of the apparatus with the coupling pins in their operative position; Fig. 4 is a horizontal sectional view on the line 4—4 of Fig. 1 showing the position of the parts when the coupling pins are in a retracted or inoperative position; Fig. 5 is a detail vertical section of the front end of the vehicle body on the line 5—5 of Fig. 3 showing the fastening means for the operating lever; Fig. 6 is a plan view of the supporting plate for the operating shaft; Fig. 7 is an enlarged vertical sectional view of the upper end of the operating shaft and the immediate parts of the operating mechanism.

Our improved horse detaching device may be used in connection with any kind of a vehicle to which draft animals are attached and for both single and double teams. In the present instance the device is shown applied to a buggy. By reference to the drawings it will be seen that the device consists of a vertically disposed operating shaft 1 arranged in front of the vehicle body and having its lower end revolubly mounted in a bearing aperture formed in the forwardly projecting end of a T-shaped supporting plate 2 which is bolted or otherwise firmly secured to the underside of the front axle 3 of the vehicle. In order to prevent the shaft 1 from interfering with the movement of the front axle, the shaft is formed in two sections connected by a universal joint $1^a$ as shown.

The shaft 1 is revolubly supported in the plate 2 by transverse pins 4 arranged in the shaft above and below the plate as shown. The shaft 1 is of sufficient length to extend to a point above the bottom of the vehicle body and is revolubly supported at its upper end in a collar 5 secured to the upper bolster of the front spring of the vehicle. Fixedly secured to the lower portion of the shaft is a cross head 6 to the opposite ends of which are pivotally connected the inner ends of pin retracting rods 7. The outer ends of the rods 7 are pivotally connected to the inner ends of the coupling pins 8 for the shafts or tongue of the vehicle whereby when the shaft 1 is turned and the cross head thus swung around to the position shown in Fig. 4 of the drawing the pins will be retracted and the shafts or tongue thus released. The rods 7 are preferably supported near their outer ends in suitable supporting clips $7^a$.

The upper end of the shaft 1 is tubular or has formed therein a socket 9 and oppositely disposed slots 10. Slidably mounted on the tubular upper end of the shaft 1 is a sprocket gear 11 through the hub of which and through the slots 10 of the shaft is arranged a cross pin 12 said pin slidably connecting the gear to the shaft. In the tubular end of the shaft is arranged a coiled spring 13 one end of which is connected to the cross pin 12 and the other end to the upper end of the shaft 1. The stress of the spring when thus arranged is exerted to hold the gear 11 up in engagement with the collar 5 in which the upper end of the shaft is mounted and whereby when the body of the vehicle is forced downwardly on its springs the collar 5 will slide the gear 11 down on the shaft against the stress of the spring 13 which when the weight is removed from the vehicle, will again immediately raise the gear.

The sprocket gear 11 is connected by a sprocket chain 14 to a larger sprocket gear 15 fixed on a short vertical shaft 16 which is revolubly mounted in a bracket 17 secured to the inner side of the front end of the vehicle body. The lower end of the shaft is engaged with a step bearing 18 arranged on the bottom of the vehicle as shown.

Fixedly secured to the upper end of the shaft 16 and sprocket gear 15 is an operating lever 19 by means of which the sprocket gears 11 and 15 and the shaft 1 are turned to release the coupling pins in the manner described. The outer end of the lever 19 is slidably engaged with a supporting bar 20 arranged in the body of the vehicle and having on its outer end a fixed stop 21 which limits the outward movement of the lever 19. On the bar 20 is also pivotally mounted a stop pawl 22 which is adapted to normally hold the lever 19 against inward movement and which is adapted to be thrown back to an out of the way position when it is desired to move the lever for the purpose of operating the releasing mechanism. When arranged as herein shown and described the lever 19 may be operated by the hand or foot of the driver.

From the foregoing description, taken in connection with the accompanying drawings, the construction and operation of the invention, may be readily understood without requiring a more extended explanation.

Various changes in the form, proportion and the minor details of construction may be resorted to without departing from the principle or sacrificing any of the advantages of this invention, as defined in the appended claims.

Having thus described our invention what we claim is:—

1. In a horse detaching device comprising in combination, an axle, a spring thereon, a body supported from the spring, releasing devices, a vertical shaft in bearings supported by the axle and body and connections whereby the rotation of the shaft operates the releasing devices, means for rotating the shaft comprising a second vertical shaft mounted in the body, a sprocket wheel thereon, a sprocket wheel slidably fixed on the first named shaft, and a sprocket chain connecting the two sprocket wheels.

2. In a horse detaching device comprising in combination, an axle, a spring thereon, a body supported from the spring, releasing devices, a vertical shaft in bearings supported by the axle and body and connections whereby the rotation of the shaft operates the releasing devices, means for rotating the shaft comprising a second vertical shaft mounted in the body, a sprocket wheel thereon, a hollow upper portion of the first named shaft provided with longitudinal slots diametrically opposite each other, a sprocket wheel slidably fixed on said hollow portion, a diametrically disposed pin in the hollow portion projecting through the slots into the sprocket wheel, and a spring in the hollow portion connected thereto at its upper end and at its lower end to the pin.

In testimony whereof we have hereunto set our hands in presence of two subscribing witnesses.

FRANKLIN P. GABLE.
ALONZO C. BUTTMAN.

Witnesses:
FRANK FOWLER,
WILLIAM S. BECKEY.

---

Copies of this patent may be obtained for five cents each, by addressing the "Commissioner of Patents, Washington, D. C."